United States Patent
Morishige et al.

(10) Patent No.: US 9,062,708 B2
(45) Date of Patent: Jun. 23, 2015

(54) THRUST SLIDING BEARING

(75) Inventors: Kouichi Morishige, Fujisawa (JP);
Katsunori Saito, Fujisawa (JP); Tadashi Watai, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/127,604

(22) PCT Filed: May 30, 2012

(86) PCT No.: PCT/JP2012/003551
§ 371 (c)(1),
(2), (4) Date: Dec. 19, 2013

(87) PCT Pub. No.: WO2012/176380
PCT Pub. Date: Dec. 27, 2012

(65) Prior Publication Data
US 2014/0119682 A1 May 1, 2014

(30) Foreign Application Priority Data
Jun. 20, 2011 (JP) ................... 2011-136827

(51) Int. Cl.
*F16C 17/04* (2006.01)
*F16C 33/10* (2006.01)
(Continued)

(52) U.S. Cl.
CPC .............. *F16C 17/04* (2013.01); *F16C 33/1065* (2013.01); *F16C 33/20* (2013.01); *F16C 2208/00* (2013.01); *F16C 17/18* (2013.01);
(Continued)

(58) Field of Classification Search
CPC .......... F16C 17/04; F16C 17/18; F16C 33/20; F16C 33/103; F16C 2208/00; F16C 2361/53; F16C 2326/05; F16C 33/1065

USPC ................... 384/282–284, 305, 420–428, 368
See application file for complete search history.

(56) References Cited

U.S. PATENT DOCUMENTS

| | | | | |
|---|---|---|---|---|
| 174,331 | A * | 2/1876 | White | 384/282 |
| 1,398,220 | A * | 11/1921 | Acheson, Jr. | 384/283 |
| 1,498,578 | A * | 6/1924 | Romano | 384/427 |

(Continued)

FOREIGN PATENT DOCUMENTS

| | | |
|---|---|---|
| JP | 2-1532 | 1/1990 |
| JP | 2-6263 | 2/1990 |

(Continued)

OTHER PUBLICATIONS

International Search Report for PCT/JP2012/003551, mailed Aug. 14, 2012.
(Continued)

*Primary Examiner* — Alan B Waits
(74) *Attorney, Agent, or Firm* — Nixon & Vanderhye P.C.

(57) ABSTRACT

A thrust sliding bearing 1 includes a synthetic resin-made upper casing 100, a synthetic resin-made lower casing 200, and a synthetic resin-made thrust sliding bearing piece 300 interposed between the upper and lower casings 100 and 200, and the thrust sliding bearing piece 300 has inner recessed portions 306 and outer recessed portions 307 which are formed on its upper surface 304 in two rows including an inner row and an outer row and a lubricating oil filled in each of these inner recessed portions 306 and outer recessed portions 307, the inner recessed portions 306 and the outer recessed portions 307 being arranged with a phase difference of an angle $\theta_1 = 6°$.

15 Claims, 10 Drawing Sheets

(51) Int. Cl.
*F16C 33/20* (2006.01)
*F16C 17/18* (2006.01)

(52) U.S. Cl.
CPC .......... *F16C 33/103* (2013.01); *F16C 2326/05* (2013.01); *F16C 2361/53* (2013.01)

(56) References Cited

U.S. PATENT DOCUMENTS

| | | | | |
|---|---|---|---|---|
| 1,603,470 | A * | 10/1926 | Johnson et al. | 29/898.056 |
| 3,466,102 | A * | 9/1969 | Goodwyn | 384/422 |
| 3,549,217 | A * | 12/1970 | Watson | 384/368 |
| RE27,651 | E * | 5/1973 | Artzer | 384/368 |
| 4,789,250 | A * | 12/1988 | Schluter | 384/305 |
| 4,854,745 | A * | 8/1989 | Kamimura et al. | 384/420 |
| 4,892,420 | A * | 1/1990 | Kruger | 384/420 |
| 4,907,289 | A * | 3/1990 | Kamimura et al. | 384/420 |
| 4,923,312 | A * | 5/1990 | Kamimura et al. | 384/420 |
| 4,969,752 | A * | 11/1990 | Kubota et al. | 384/420 |
| 5,286,115 | A | 2/1994 | Toji et al. | |
| 5,476,326 | A * | 12/1995 | Ueno et al. | 384/125 |
| 5,549,394 | A * | 8/1996 | Nowak et al. | 384/282 |
| 5,664,890 | A * | 9/1997 | Nowak et al. | 384/282 |
| 6,109,792 | A * | 8/2000 | Koenig | 384/282 |
| 6,393,699 | B1 * | 5/2002 | Koenig | 29/898.06 |
| 6,393,818 | B1 * | 5/2002 | Nakagawa et al. | 59/4 |
| 6,918,701 | B2 * | 7/2005 | Ueno et al. | 384/420 |
| 7,273,317 | B2 * | 9/2007 | Miyata et al. | 384/420 |
| 7,293,918 | B2 * | 11/2007 | Watai et al. | 384/420 |
| 7,320,549 | B2 * | 1/2008 | Kubota et al. | 384/283 |
| 7,357,578 | B2 * | 4/2008 | Watai et al. | 384/420 |
| 7,399,122 | B2 * | 7/2008 | Fujita et al. | 384/276 |
| 7,431,507 | B2 * | 10/2008 | Tsuji et al. | 384/276 |
| 7,470,065 | B2 * | 12/2008 | Stadlmayr et al. | 384/285 |
| 7,588,384 | B2 * | 9/2009 | Yokohara | 403/135 |
| 8,696,205 | B2 * | 4/2014 | Tavecchio | 384/36 |
| 8,740,233 | B2 * | 6/2014 | Morishige et al. | 280/124.155 |
| 8,746,980 | B2 * | 6/2014 | Oki et al. | 384/213 |
| 2003/0021711 | A1 * | 1/2003 | Klink et al. | 417/572 |
| 2004/0028303 | A1 * | 2/2004 | Ueno et al. | 384/276 |
| 2007/0116391 | A1 * | 5/2007 | Watai et al. | 384/420 |
| 2007/0237439 | A1 * | 10/2007 | Watai et al. | 384/420 |
| 2008/0310780 | A1 * | 12/2008 | Watai et al. | 384/420 |
| 2009/0180719 | A1 * | 7/2009 | Miyata et al. | 384/147 |
| 2009/0220179 | A1 * | 9/2009 | Kaneko et al. | 384/420 |
| 2010/0104228 | A1 * | 4/2010 | Kaneko | 384/420 |
| 2012/0243814 | A1 * | 9/2012 | Sakairi et al. | 384/297 |
| 2012/0251383 | A1 * | 10/2012 | Toda et al. | 420/482 |
| 2013/0009376 | A1 * | 1/2013 | Kaneko et al. | 280/124.155 |
| 2013/0142462 | A1 * | 6/2013 | Morishige et al. | 384/130 |
| 2014/0169711 | A1 * | 6/2014 | Hanaka et al. | 384/284 |

FOREIGN PATENT DOCUMENTS

| | | |
|---|---|---|
| JP | 4-47445 | 11/1992 |
| JP | 4-52488 | 12/1992 |
| JP | 8-2500 | 1/1996 |
| JP | 2001-082457 | 3/2001 |
| JP | 2007-303613 | 11/2007 |
| WO | WO 2011/070772 | 6/2011 |
| WO | WO 2011/070772 A1 | 6/2011 |

OTHER PUBLICATIONS

Microfilm of spec and drawings—JP Model Application No. 081678/1979 (Laid Open No. 181018/1980), Dec. 16, 1980.

Microfilm of spec and drawings—JP Model Application No. 46471/1991 (Laid Open No. 132218/1992), Dec. 7, 1992.

Microfilm of spec and drawings—JP Model Application No. 71997/1982 (Laid Open No. 175237/1983), Nov. 24, 1983.

Microfilm of spec and drawings—JP Model Application No. 081678/1979 (Laid Open No. 181018/1980), Dec. 26, 1980.

Corrected Version of English translation of International Preliminary Report on Patentability in PCT/JP2012/003551 dated Feb. 27, 2014 w/corrected version of the PCT/ISA/237.

Corrected version of International Search Report in PCT/JP2012/003551.

Republished front page of WO 2012/176380.

* cited by examiner

THRUST SLIDING BEARING

This application is the U.S. national phase of International Application No. PCT/JP2012/003551 filed 30 May 2012 which designated the U.S. and claims priority to JP Patent Application No. 2011-136827 filed 20 Jun. 2011, the entire contents of each of which are hereby incorporated by reference.

TECHNICAL FIELD

The present invention relates particularly to a thrust sliding bearing, and more particularly to a synthetic resin-made sliding bearing which is suitably incorporated as a sliding bearing of a strut-type suspension (Macpherson type) in a four-wheeled motor vehicle.

BACKGROUND ART

In general, a strut-type suspension is mainly used in a front wheel of a four-wheeled motor vehicle, and is constructed such that a strut assembly incorporating a hydraulic shock absorber in an outer cylinder formed integrally with a main shaft is combined with a suspension coil spring. Among such suspensions, there is a type of structure in which the axis of the coil spring is actively offset with respect to the axis of that strut, so as to allow the sliding of a piston rod of the shock absorber incorporated in the strut to be effected smoothly, and there is another type of structure in which the coil spring is disposed by aligning the axis of the coil spring with the axis of the strut. In either structure, a bearing is disposed between a mounting member for a motor vehicle body and an upper spring seat of the coil spring to allow the rotation to be effected smoothly when the strut assembly rotates together with the coil spring by the steering operation.

In this bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. As compared with the rolling bearing, the synthetic resin-made sliding bearing has a high frictional torque and therefore has the problem that the steering operation is made heavy. Furthermore, both bearings have the problem that the steering operation is made heavy due to the high sliding frictional force of a dust seal formed of a rubber elastomer fitted to prevent the ingress of foreign objects such as dust onto sliding surfaces, and the synthetic resin-made sliding bearing in particular has the problem that the steering operation is made much heavier.

To overcome the above-described problems, the present applicant proposed synthetic resin-made thrust sliding bearings which are each comprised of a synthetic resin-made upper casing, a synthetic resin-made lower casing, and a synthetic resin-made sliding bearing piece interposed between the upper and lower casings, wherein the upper and lower casings are combined by elastic fitting, and a resiliently fitting portion and a sealing portion based on labyrinth action are respectively formed between the upper and lower casings and between an inner peripheral surface side and an outer peripheral surface side, to prevent the entry of foreign objects such as dust onto the bearing sliding surfaces by means of that sealing portion (described in Patent Document 1, Patent Document 2, Patent Document 3, Patent Document 4, and Patent Document 5).

This thrust sliding bearing will be described with reference to drawings as follows. In FIGS. 20 and 21, a synthetic resin-made thrust sliding bearing 1 is comprised of a synthetic resin-made upper casing 10, a synthetic resin-made lower casing 20, and a synthetic resin-made thrust sliding bearing piece 30 interposed between the upper and lower casings 10 and 20. The upper casing 10 includes an upper disk-like planar portion 12 having a circular hole 11 in its central portion, a cylindrical engaging suspended portion 13 formed integrally at an outer peripheral edge of the upper disk-like planar portion 12, and an engaging hook portion 14 formed on an inner peripheral surface of an end portion of the cylindrical engaging suspended portion 13. Meanwhile, the lower casing 20 includes a cylindrical portion 22 having an inner peripheral surface defining an insertion hole 21, an annular wide collar portion 24 formed integrally on an outer peripheral surface of the cylindrical portion 22 in such a manner as to cause a portion 23 of the cylindrical portion 22 to project, a cylindrical engaging projecting portion 25 formed integrally at an outer peripheral edge of the annular wide collar portion 24, and an engaging portion 26 formed on an outer peripheral surface of a lower end of the cylindrical engaging projecting portion 25. The upper casing 10 is combined with the lower casing 20 by causing the engaging hook portion 14 to be resiliently fitted to the engaging portion 26 of the lower casing 20. Pluralities of grooves 27 and 28 are respectively formed radially on the upper and lower surfaces of the thrust sliding bearing piece 30 with a phase difference of 30° in the circumferential direction with respect to each other, and these grooves 27 and 28 serve as a sump section for lubricating oil such as grease.

PRIOR ART DOCUMENTS

Patent Documents

[Patent Document 1] JP-UM-B-1992-52488
[Patent Document 2] JP-UM-B-1990-1532
[Patent Document 3] JP-UM-B-1990-6263
[Patent Document 4] JP-UM-B-1996-2500
[Patent Document 5] JP-UM-B-1992-47445

SUMMARY OF THE INVENTION

Problems that the Invention is to Solve

With the above-described thrust sliding bearings, it is possible to overcome the problem of an increase in the frictional resistance force due to the dust seal which is formed of a rubber elastomer and fitted between the sliding surfaces in such a manner as to surround the sliding surfaces, and it is possible to obtain a stable and smooth steering operating force by preventing as practically as possible the entry of foreign objects such as dust onto the sliding surfaces.

The above-described thrust sliding bearings exhibit low frictional properties by the combination of the reduction of friction by virtue of the sliding among synthetic resins including the synthetic resin-made upper casing, the synthetic resin-made lower casing, and the synthetic resin-made thrust sliding bearing piece interposed between the upper and lower casings and of the reduction of friction by virtue of the lubricating oil such as grease filled in the pluralities of grooves formed on the upper and lower surfaces of the thrust sliding bearing piece. In recent years, however, there has been a demand for the reduction of the steering operating force through further lower frictional properties of the sliding bearing.

As a result of conducting strenuous studies in order to satisfy the above-described demand, the present inventors found that further lower frictional properties can be exhibited by changing profiles of the grooves which are formed on the upper and lower surfaces of the thrust sliding bearing piece interposed between the upper and lower casings and serve as a sump section for lubricating oil such as grease.

The present invention has been devised on the basis of the above-described finding, and its object is to provide a synthetic resin-made thrust sliding bearing which is capable of exhibiting further lower frictional properties.

Means for Overcoming the Problems

A thrust sliding bearing in accordance with the present invention comprises: an upper casing having an upper annular planar portion; a synthetic resin-made lower casing which is superposed on the upper casing so as to be rotatable about an axis of the upper casing and has a lower annular planar portion opposing the upper annular planar portion of the upper casing, a first and a second annular protrusion formed on the lower annular planar portion concentrically with each other, and a wide lower annular recess surrounded by the first and the second annular protrusion; and a synthetic resin-made thrust sliding bearing piece disposed in the lower annular recess of the lowering casing and having an annular thrust sliding bearing surface which is brought into sliding contact with at least one of the upper annular planar portion and the lower annular planar portion, wherein the thrust sliding bearing piece has pluralities of inner recessed portions and outer recessed portions which are formed on the thrust sliding bearing surface along a circumferential direction in at least two rows including an inner row and an outer row in a radial direction, and a lubricating oil filled in each of these pluralities of inner recessed portions and outer recessed portions, the inner recessed portions and the outer recessed portions being arranged with a circumferential direction phase difference with respect to each other.

According to the thrust sliding bearing in accordance with the present invention, since the inner recessed portions and the outer recessed portions, which are formed on the thrust sliding bearing surface of the synthetic resin-made thrust sliding bearing interposed between the upper and lower casings, are arranged along the circumferential direction, i.e., the sliding direction of the thrust sliding bearing, the lubricating oil such as grease filled in the inner recessed portions and the outer recessed portions is constantly fed to the thrust sliding bearing surface, i.e., the sliding surface, during the relative sliding of the upper and lower casings and the thrust sliding bearing piece. In consequence, since the lubricating oil is constantly present at the thrust sliding bearing surface during the relative rotation, further lower frictional properties are exhibited at the thrust sliding bearing surface by virtue of this lubricant.

In the thrust sliding bearing in accordance with the present invention, each of the plurality of inner recessed portions may be defined by an inner arcuate wall surface extending arcuately about the axis, an outer arcuate wall surface extending arcuately about the axis on a radially outer side with respect to the inner arcuate wall surface, a pair of semicircular wall surfaces respectively connected to both the inner arcuate wall surface and the outer arcuate wall surface and opposing each other in the circumferential direction, and a bottom surface connected to the inner arcuate wall surface, the outer arcuate wall surface, and the pair of semicircular wall surfaces. Meanwhile, each of the plurality of outer recessed portions may be defined by an inner arcuate wall surface extending arcuately about the axis, an outer arcuate wall surface extending arcuately about the axis on the radially outer side with respect to the inner arcuate wall surface, a pair of semicircular wall surfaces respectively connected to both the inner arcuate wall surface and the outer arcuate wall surface and opposing each other in the circumferential direction, and a bottom surface connected to the inner arcuate wall surface, the outer arcuate wall surface, and the pair of semicircular wall surfaces.

In the thrust sliding bearing in accordance with the present invention, the thrust sliding bearing piece may have a circular hole and an annular recessed portion formed on the thrust sliding bearing surface in such a manner as to surround the circular hole.

Since this annular recessed portion serves as a sump section for the lubricating oil such as grease and is capable of preventing the efflux of the lubricating oil to the circular hole side of the thrust sliding bearing piece, the lubricating oil can be constantly made present at the thrust sliding bearing surface, so that further lower frictional properties are exhibited by this annular recessed portion. The lubricating oil such as grease may be filled in advance in the annular recessed portion, but the lubricating oil from the inner recessed portions and the outer recessed portions may be accommodated therein.

A ratio of a total area of opening surfaces of the pluralities of inner recessed portions and outer recessed portions to a total area of surfaces combining the opening surfaces of the pluralities of inner recessed portions and outer recessed portions and the thrust sliding bearing surface, or the ratio of the total area of the opening surfaces of the pluralities of inner recessed portions and outer recessed portions to a total area of surfaces combining an opening surface of the annular recessed portion, the opening surfaces of the pluralities of inner recessed portions and outer recessed portions, and the thrust sliding bearing surface, is 20 to 50%, more preferably 30 to 40%.

In order to allow the low frictional properties of the lubricating oil to be exhibited satisfactorily in the inner recessed portions, the outer recessed portions, and the annular recessed portion for holding the lubricating oil such as grease, it suffices if a ratio of a total area of opening surfaces of the pluralities of inner recessed portions and outer recessed portions to a total area of surfaces combining the opening surfaces of the pluralities of inner recessed portions and outer recessed portions and the thrust sliding bearing surface, or the ratio of the total area of the opening surfaces of the pluralities of inner recessed portions and outer recessed portions to a total area of surfaces combining an opening surface of the annular recessed portion, the opening surfaces of the pluralities of inner recessed portions and outer recessed portions, and the thrust sliding bearing surface, is at least 20%. If the ratio exceeds 50%, a decline in the strength of the thrust sliding bearing piece results, and plastic deformation such as creep is likely to occur.

In a preferred example, the upper annular planar portion has a circular hole in its central portion, the lower annular planar portion having in its central portion an insertion hole concentric with the circular hole of the upper annular planar portion; the upper casing has a cylindrical engaging suspended portion formed integrally on an outer peripheral edge of an annular lower surface of the upper annular planar portion and an annular engaging portion formed on an inner peripheral surface of the cylindrical engaging suspended portion; the first annular protrusion is integrally formed on an annular upper surface of the lower annular planar portion, while the second annular protrusion is integrally formed on an outer peripheral edge of the annular upper surface of the lower annular planar portion in such a manner as to be radially outwardly spaced apart a predetermined interval from the first annular protrusion; the lower annular recess is defined by an outer peripheral surface of the first annular protrusion, an inner peripheral surface of the second annular protrusion, and the annular upper surface of the lower annular planar portion; and the lower casing further has an annular engaging portion formed on an outer peripheral surface of the second annular protrusion, and the upper casing is combined with the lower casing by causing the annular engaging portion thereof to be resiliently fitted to the annular engaging portion of the lower casing.

According to the above-described example, since the upper and lower casings are combined with each other by causing the annular engaging portion of the upper casing to be resiliently fitted to the annular engaging portion of the lower casing, the assembly operation thereof can be performed very simply.

In another preferred example of the thrust sliding bearing in accordance with the present invention, the upper casing further includes a first cylindrical suspended portion formed integrally on the annular lower surface of the upper annular planar portion in such a manner as to be located radially outwardly away from a peripheral edge of the circular hole in the central portion of the upper annular planar portion and to be radially inwardly spaced apart a predetermined interval from the inner peripheral surface of the cylindrical engaging suspended portion, so as to form at its outer peripheral surface an upper outer annular groove in cooperation with the inner peripheral surface of the cylindrical engaging suspended portion; the lower casing further includes a third annular protrusion formed integrally on the annular upper surface of the lower annular planar portion in such a manner as to be radially outwardly spaced apart a predetermined interval from the outer peripheral surface of the first annular protrusion, so as to form at its outer peripheral surface a lower outer annular groove in cooperation with an inner peripheral surface of the second annular protrusion; and the upper casing is combined with the lower casing such that the second annular protrusion is disposed in the upper outer annular groove, while the first cylindrical suspended portion is disposed in the lower outer annular groove so as to radially overlap with the second annular protrusion and the third annular protrusion.

According to the above-described thrust sliding bearing, since the upper casing is combined with the lower casing by resiliently fitting the annular engaging portions such that the second annular protrusion is disposed in the upper outer annular groove, and the first cylindrical suspended portion is disposed in the lower outer annular groove so as to radially overlap with the second and third annular protrusions, sealed portions based on labyrinth action are formed at radially overlapping portions of the first cylindrical suspended portion and the second and third annular protrusions and at resiliently fitting portions of the engaging portions, thereby effectively preventing the entry of foreign objects such as dust onto the thrust sliding bearing surface between the upper and lower casings.

In still another preferred example of the thrust sliding bearing in accordance with the present invention, the upper casing further includes a second cylindrical suspended portion formed integrally on the annular lower surface of the upper annular planar portion in such a manner as to be radially inwardly spaced apart a predetermined interval from an inner peripheral surface of the first cylindrical suspended portion, so as to form a wide upper annular recess in cooperation with the inner peripheral surface and the annular lower surface of the upper annular planar portion, and the first annular protrusion being radially outwardly adjacent to the insertion hole via an annular shoulder portion, wherein the upper casing is combined with the lower casing such that a lower end face of the second cylindrical suspended portion opposes an upper surface of the annular shoulder portion with a clearance therebetween, and such that the second cylindrical suspended portion radially overlaps with the first annular protrusion.

According to the above-described thrust sliding bearing, since the upper casing is combined with the lower casing by resiliently fitting the annular engaging portions such that the second cylindrical suspended portion radially overlaps with the first annular protrusion, and the first cylindrical suspended portion radially overlaps with the second and third annular protrusions by being disposed in the lower outer annular groove, sealed portions based on labyrinth action are formed at overlapping portions of the second cylindrical suspended portion and the first annular protrusion, at overlapping portions of the first cylindrical suspended portion and the second and third annular protrusions, and at resiliently fitting portions of the engaging portions, thereby further preventing the entry of foreign objects such as dust onto the thrust sliding bearing surface between the upper and lower casings.

In the thrust sliding bearing in accordance with the present invention, the second cylindrical suspended portion may have an inner peripheral surface with a diameter identical to that of the circular hole in the central portion of the upper annular planar portion, but, alternatively, the second cylindrical suspended portion may be radially outwardly adjacent to the insertion hole in the central portion of the upper annular planar portion via an annular shoulder portion, in which case the lower casing may further include a fourth annular protrusion which is integrally formed on an upper surface of the annular shoulder portion of the lower annular planar portion in such a manner as to be radially inwardly spaced apart a predetermined interval from the first annular protrusion, so as to form at its outer peripheral surface a lower inner annular groove in cooperation with the inner peripheral surface of the first annular protrusion, wherein the upper casing may be combined with the lower casing such that the second cylindrical suspended portion is disposed in the lower inner annular groove so as to radially overlap with the first annular protrusion and the fourth annular protrusion.

According to the above-described thrust sliding bearing in accordance with the present invention, since the upper casing is combined with the lower casing such that the second cylindrical suspended portion is disposed in the lower inner annular groove to radially overlap with the first annular protrusion and the fourth annular protrusion, sealed portions based on labyrinth action are further formed at radially overlapping portions of the second cylindrical suspended portion and the first and forth annular protrusions, with the result that the entry of foreign objects such as dust between the upper and lower casings, particularly from the inner peripheral side, onto the thrust sliding bearing surface is further prevented.

In the thrust sliding bearing in accordance with the present invention, the fourth annular protrusion may have an inner peripheral surface with a diameter identical to that of the insertion hole formed in the central portion of the lower annular planar portion, but, alternatively, the fourth annular protrusion may be integrally formed on an upper surface of the annular shoulder portion of the lower annular planar portion in such a manner as to be radially outwardly away from the insertion hole in the central portion of the lower annular planar portion. In this case, the upper casing may further include a third cylindrical suspended portion which is integrally formed on a lower surface of the annular shoulder portion of the upper annular planar portion and has an inner peripheral surface with a diameter identical to that of the circular hole in the central portion of the upper annular planar portion so as to form at its outer peripheral surface an upper inner annular groove in cooperation with an inner peripheral surface of the second cylindrical suspended portion, wherein the upper casing may be combined with the lower casing such that a lower end face of the third cylindrical suspended portion opposes the upper surface of the annular shoulder portion of the lower annular planar portion with a clearance therebetween, and the third cylindrical suspended portion radially overlaps with the fourth annular protrusion, and such that the fourth annular protrusion is disposed in the upper inner annular groove.

According to the above-described thrust sliding bearing, since the upper casing is combined with the lower casing such that the third cylindrical suspended portion radially overlaps with the fourth annular protrusion, the fourth annular protrusion is disposed in the upper inner annular groove, and the second cylindrical suspended portion is disposed in the lower inner annular groove so as to radially overlap with the first annular protrusion and the fourth annular protrusion, sealed portions based on labyrinth action are formed at radially overlapping portions of the second and third cylindrical suspended portions and the first annular protrusion and the fourth annular protrusion, with the result that the entry of foreign objects such as dust between the upper and lower casings, particularly from the inner peripheral side, onto the thrust sliding bearing surface is further prevented.

In the present invention, the lower casing may include a hollow cylindrical portion which is integrally formed on the annular lower surface of the lower annular planar portion and has an inner peripheral surface with a diameter identical to the insertion hole in the central portion of the annular lower surface.

According to the thrust sliding bearing having the hollow cylindrical portion which is integrally formed on the annular lower surface of the lower annular planar portion of the lower casing and has an inner peripheral surface with a diameter identical to the insertion hole, the mounting operation can be performed very easily by inserting the hollow cylindrical portion into a mounting hole formed in a mounting member for mounting the thrust sliding bearing.

In the thrust sliding bearing in accordance with the present invention, the upper casing may further include a hollow cylindrical portion which is integrally formed on the annular lower surface of the upper annular planar portion and has an inner peripheral surface with a diameter identical to the circular hole in the central portion of the upper annular planar portion, in which case the lower casing further includes a hollow cylindrical portion which is integrally formed on the annular lower surface of the lower annular planar portion and has an inner peripheral surface with a diameter identical to the insertion hole, wherein the upper casing may be combined with the lower casing such that an outer peripheral surface of the hollow cylindrical portion is brought into sliding contact with the inner peripheral surface of the hollow cylindrical portion of the lower casing.

According to the above-described thrust sliding bearing in accordance with the present invention, in allowing smooth sliding under a thrust load, the sliding under a thrust load can be smoothly allowed by the sliding of the synthetic resins in the radial bearing portion formed between the outer peripheral surface of the hollow cylindrical portion of the upper casing and the inner peripheral surface of the hollow cylindrical portion of the lower casing.

In the thrust sliding bearing in accordance with the present invention, the upper annular planar portion may have an annular upper surface having a circular belt-shaped flat surface with a predetermined width in a radially outward direction from the outer peripheral edge of the circular hole in the central portion and a truncated conical surface sloping downwardly from an outer peripheral edge of the circular belt-shaped flat surface to a cylindrical outer peripheral surface of the cylindrical engaging suspended portion. Furthermore, the upper annular planar portion may further have a circular belt-shaped projecting portion which integrally projects axially upwardly from the circular belt-shaped flat surface with the predetermined width in the radially outward direction from the outer peripheral edge of the circular hole in the central portion.

According to the thrust sliding bearing in accordance with the above-described aspect, in a case where a fluctuating load such as an inclination has acted on the vehicle body-side mounting member, it is possible to more reliably avoid interference at least at the resiliently fitting portions of the engaging portion of the cylindrical engaging suspended portion and the engaging portion of the cylindrical engaging projecting portion.

In the present invention, as the synthetic resin for forming the upper casing and the lower casing, a thermoplastic synthetic resin such as polyacetal resin, polyamide resin, and polyester resin is suitably used. In addition, as the synthetic resin for forming the thrust sliding bearing piece, a thermoplastic synthetic resin such as polyamide resin, polyolefin resin, and polyester resin, which excel in the sliding characteristics with respect to the thermoplastic synthetic resin for forming the upper and lower casings, is suitably used.

Advantages of the Invention

According to the present invention, since the inner recessed portions and the outer recessed portions formed on the annular thrust sliding bearing surface are arranged along the circumferential direction, i.e., the sliding direction of the thrust sliding bearing, the lubricating oil such as grease filled in the inner recessed portions and the outer recessed portions is constantly fed to the annular thrust sliding bearing surface during the relative sliding of the upper and lower casings and the thrust sliding bearing piece, and the lubricating oil is constantly present at the annular thrust sliding bearing surface during sliding. Thus, it is possible to provide a thrust sliding bearing which is capable of exhibiting further lower frictional properties.

MODE FOR CARRYING OUT THE INVENTION

Figure 1:
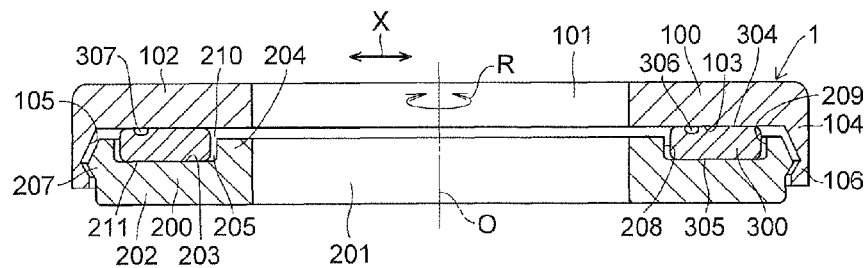
FIG. 1 is an explanatory cross-sectional view of a preferred embodiment of the invention.

Hereafter, a more detailed description will be given of the present invention with reference to the preferred embodiments shown in the drawings. It should be noted that the present invention is not limited to these embodiments.

In FIGS. 1 to 7, a thrust sliding bearing 1 in accordance with a first embodiment is comprised of a synthetic resin-made upper casing 100, a synthetic resin-made lower casing 200, and a synthetic resin-made thrust sliding bearing piece 300 interposed between the upper and lower casings 100 and 200.

The upper casing 100 includes an upper annular planar portion 102 having a circular hole 101 in its central portion; a cylindrical engaging suspended portion 104 formed integrally on an outer peripheral edge of an annular lower surface 103 of the upper annular planar portion 102; and an annular engaging portion 106 formed on an end portion of an inner peripheral surface 105 of the cylindrical engaging suspended portion 104.

The lower casing 200, which is superposed on the upper casing 100 so as to be rotatable about an axis O of the upper casing 100 in a circumferential direction R, includes a lower annular planar portion 202 which opposes the upper annular planar portion 102 of the upper casing 100 and has in its central portion an insertion hole 201 identical in diameter and concentric with the circular hole 101 of the upper casing 100; first annular protrusion 204 which is integrally formed on an annular upper surface 203 of the lower annular planar portion 202 and has an inner peripheral surface with a diameter identical to that of the insertion hole 201; second annular protrusion 206 which is integrally formed on an outer peripheral edge of the annular upper surface 203 of the lower annular planar portion 202 concentrically with the annular protrusion 204 in such a manner as to be radially outwardly spaced apart a predetermined interval from the annular protrusion 204, and which forms at its inner peripheral surface 209 a wide lower annular recess 205 in cooperation with an outer peripheral surface 208 of the annular protrusion 204 and the annular upper surface 203 of the lower annular planar portion 202; and an annular engaging portion 207 formed on an outer peripheral surface of a lower end of the annular protrusion 206. The lower annular recess 205 surrounded by the annular protrusions 204 and 206 is defined by the outer peripheral surface 208 of the annular protrusion 204, the inner peripheral surface 209 of the annular protrusion 206, and the annular upper surface 203 of the lower annular planar portion 202.

The thrust sliding bearing piece 300 has a circular hole 302 defined by an inner peripheral surface 301 having a diameter larger than the diameter of the outer peripheral surface 208 of the annular protrusion 204 of the lower casing 200; an outer peripheral surface 303 having a diameter smaller than the diameter of the inner peripheral surface of the annular protrusion 206 of the lower casing 200; an annular upper surface 304 serving as an annular thrust sliding bearing surface; and an annular lower surface 305. The thrust sliding bearing piece 300 is interposed between the upper and lower casings 100 and 200 by being disposed in the wide lower annular recess 205 while maintaining annular clearances between its inner peripheral surface 301 and the outer peripheral surface 208 of the annular protrusion 204 and between its outer peripheral surface 303 and the inner peripheral surface 209 of the annular protrusion 206, respectively, such that its upper surface 304 projects above an opening surface 210 of the lower annular recess 205 and is brought into sliding contact with the annular lower surface 103 of the upper annular planar portion 102, while its lower surface 305 is brought into sliding contact with the annular upper surface 203 defining a bottom surface 211 of the lower annular recess 205.

As particularly shown in FIGS. 2 to 7, the thrust sliding bearing piece 300 further has pluralities of inner recessed portions 306 and outer recessed portions 307 which are formed on its upper surface 304 along the circumferential direction R in two rows including an inner row and an outer row in a radial direction X, and a lubricating oil filled in each of these pluralities of inner recessed portions 306 and outer recessed portions 307. The inner recessed portions 306 and the outer recessed portions 307 are arranged with a phase difference of a predetermined angle θ1, i.e., an angle θ1=6° in this embodiment, in the circumferential direction R with respect to each other.

Each of the plurality of inner recessed portions 306 located in the inner row is defined by an inner arcuate wall surface 308 extending arcuately in the circumferential direction R about the axis O; an outer arcuate wall surface 309 extending arcuately in the circumferential direction R about the axis O on a radially outer side with respect to the inner arcuate wall surface 308; a pair of semicircular wall surfaces 310 respectively connected to both the inner arcuate wall surface 308 and the outer arcuate wall surface 309 and opposing each other in the circumferential direction R; and a bottom surface 311 connected to the inner arcuate wall surface 308, the outer arcuate wall surface 309, and the pair of semicircular wall surfaces 310.

Each of the plurality of outer recessed portions 307 located in the outer row is defined by an inner arcuate wall surface 312 extending arcuately in the circumferential direction R about the axis O; an outer arcuate wall surface 313 extending arcuately in the circumferential direction R about the axis O on the radially outer side with respect to the inner arcuate wall surface 312; a pair of semicircular wall surfaces 314 respectively connected to both the inner arcuate wall surface 312 and the outer arcuate wall surface 313 and opposing each other in the circumferential direction R; and a bottom surface 315 connected to the inner arcuate wall surface 312, the outer arcuate wall surface 313, and the pair of semicircular wall surfaces 314.

Figure 2:
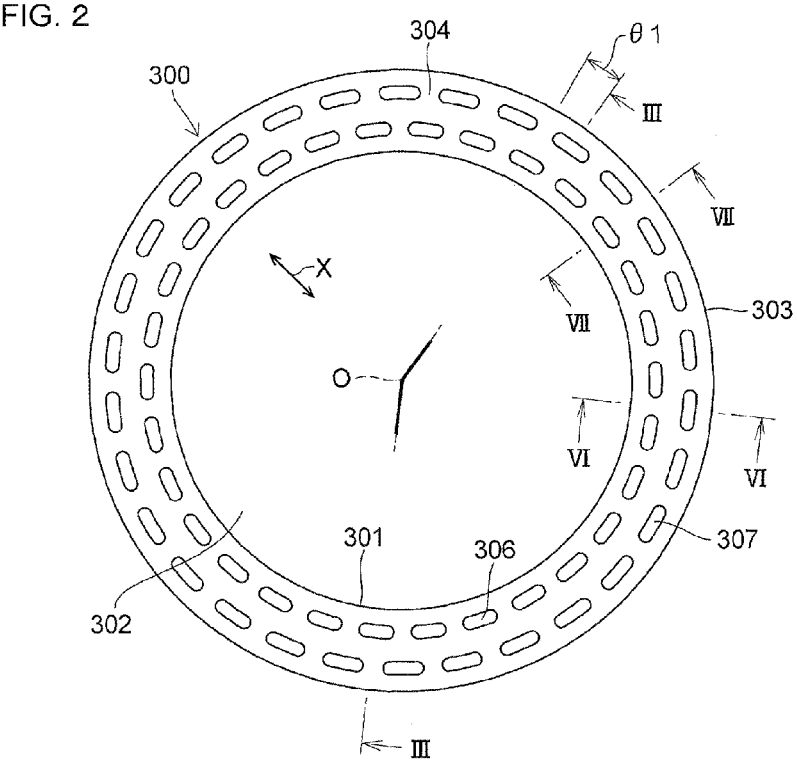
FIG. 2 is an explanatory plan view of a thrust bearing piece in the embodiment shown in FIG. 1.
Figure 3:
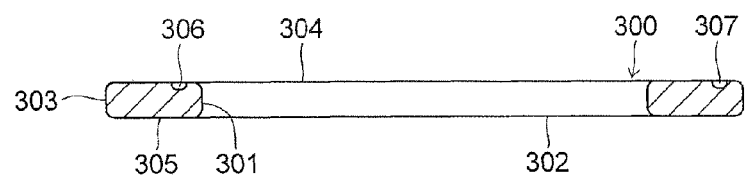
FIG. 3 is an explanatory cross-sectional view, taken in the direction of arrows along line III-III shown in FIG. 2, of the thrust sliding bearing piece in the embodiment shown in FIG. 1.
Figure 4:
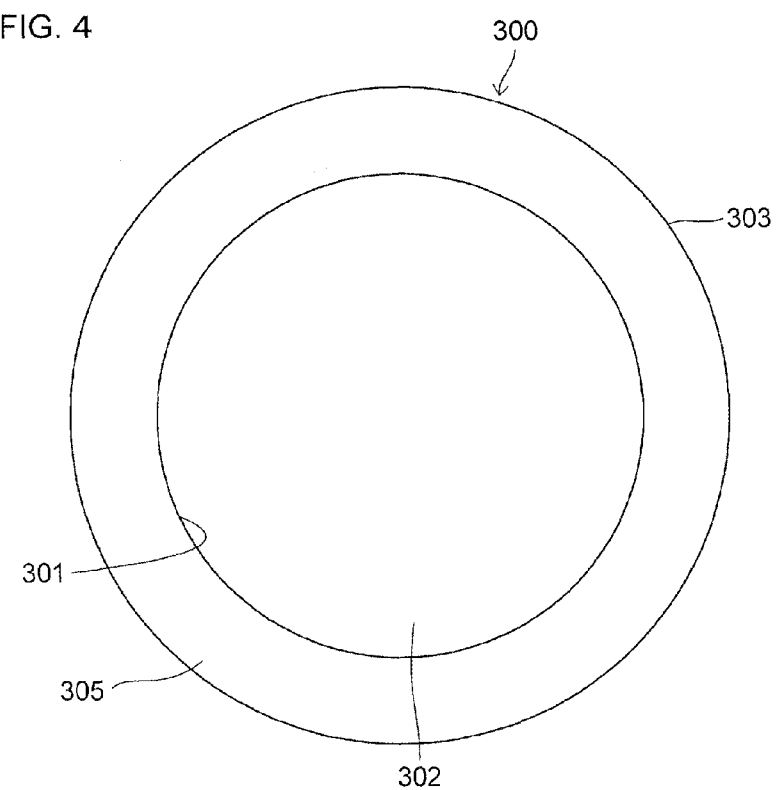
FIG. 4 is an explanatory rear view of the thrust bearing piece in the embodiment shown in FIG. 1.
Figure 5:
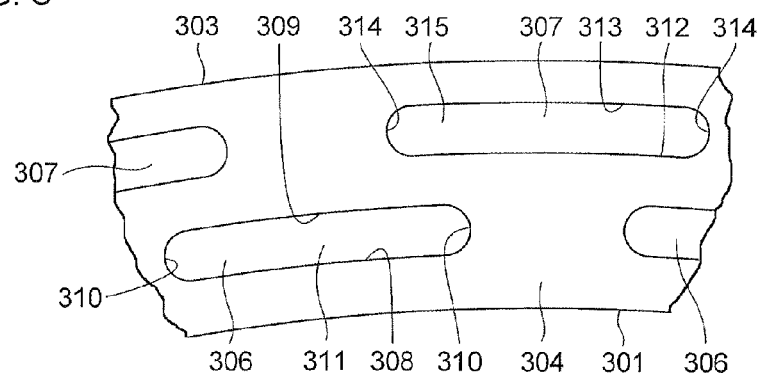
FIG. 5 is a partially enlarged explanatory plan view of the thrust bearing piece in the embodiment shown in FIG. 1.
Figure 6:
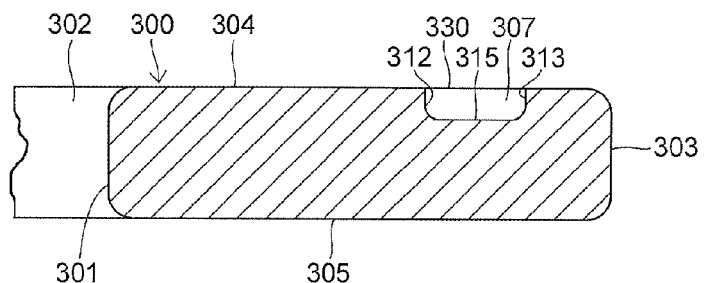
FIG. 6 is an explanatory cross-sectional view, taken in the direction of arrows along line VI-VI shown in FIG. 2, of the thrust sliding bearing piece in the embodiment shown in FIG. 1.
Figure 7:
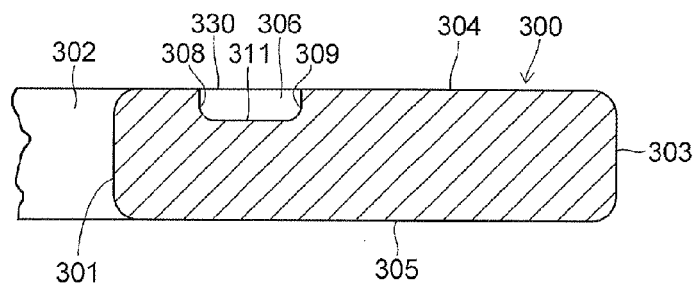
FIG. 7 is an explanatory cross-sectional view, taken in the direction of arrows along line VII-VII shown in FIG. 2, of the thrust sliding bearing piece in the embodiment shown in FIG. 1.

The pluralities of inner recessed portions 306 and outer recessed portions 307, which are formed on the annular upper surface 304 of the thrust sliding bearing piece 300 along the circumferential direction R in two rows including the inner row and the outer row in the radial direction X, are formed such that the ratio of a total area of opening surfaces 330 of the inner recessed portions 306 and the outer recessed portions 307 to a total area of surfaces combining the opening surfaces 330 of the inner recessed portions 306 and the outer recessed portions 307 and the annular upper surface 304 of the thrust sliding bearing piece 300, i.e., the thrust sliding bearing surface, is set to 20 to 50%, preferably 30 to 40%, i.e., to 30% in the embodiment shown in FIG. 2.

Further, the upper casing 100 is combined with the lower casing 200 by causing the annular engaging portion 106 formed on the inner peripheral surface of the end portion of the cylindrical engaging suspended portion 104 to be resiliently fitted to the annular engaging portion 207 formed on the outer peripheral surface of the lower end of the annular protrusion 206 of the lower casing 200.

In the thrust sliding bearing 1 thus formed, as the inner recessed portions 306 and the outer recessed portions 307 are formed on the annular upper surface 304 of the thrust sliding bearing piece 300, in the relative rotation about the axis O in the circumferential direction R between the upper surface 304 of the thrust sliding bearing piece 300 and the annular lower surface 103 of the upper annular planar portion 102 of the upper casing 100, the area of contact between, on the one hand, the annular upper surface 304 constituting the thrust sliding bearing surface and serving as the sliding surface and, on the other hand, the mating member, i.e., the annular lower surface 103 of the upper annular planar portion 102 of the upper casing 100, is reduced to thereby increase the surface pressure (load per unit area) acting on the annular upper surface 304, whereby it is possible to attain further reduction of friction through the combination of the reduction of friction by virtue of the friction among synthetic resins and of the reduction of friction by virtue of the presence at the sliding surfaces of the lubricating oil filled in the inner recessed portions 306 and the outer recessed portions 307.

Figure 8:
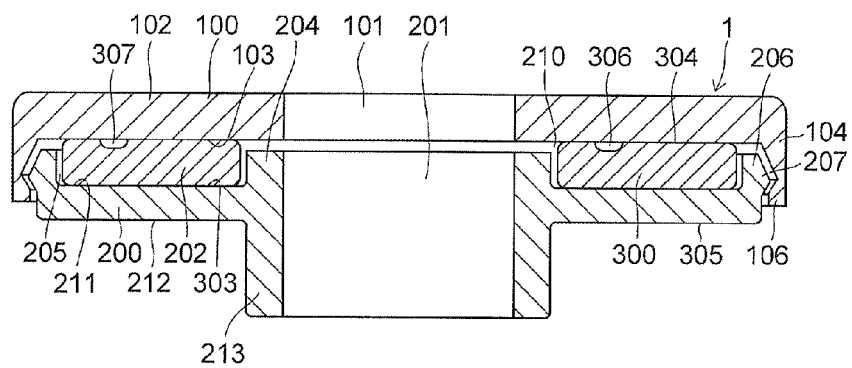
FIG. 8 is an explanatory cross-sectional view of another preferred embodiment of the invention.

As shown in FIG. 8, the thrust sliding bearing 1 may further have a hollow cylindrical portion 213 which is integrally formed on an annular lower surface 212 of the lower annular planar portion 202 of the lower casing 200 and has an inner peripheral surface with a diameter identical to that of the insertion hole 201.

Figure 9:
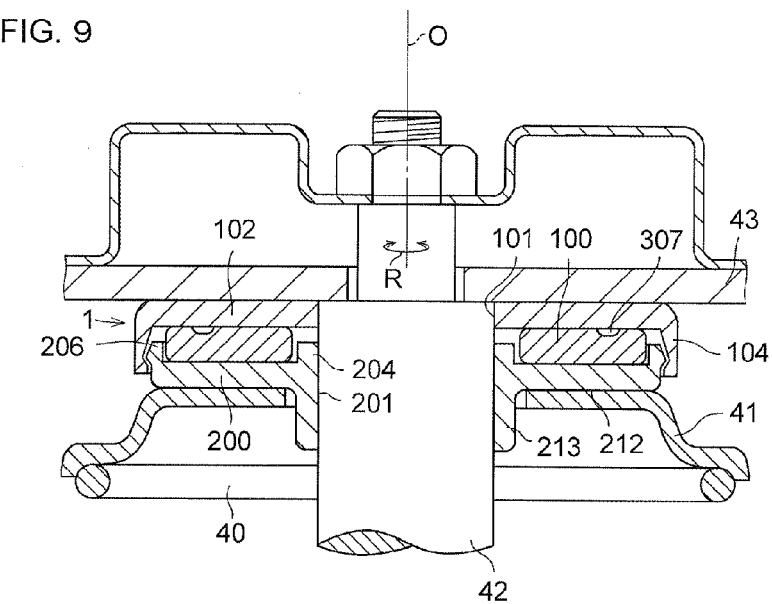
FIG. 9 is an explanatory cross-sectional view of an example in which the thrust sliding bearing of the embodiment shown in FIG. 8 is incorporated in a strut-type suspension.

According to the thrust sliding bearing 1 having the cylindrical portion 213 on the annular lower surface 212 of the lower casing 200, the operation of mounting the thrust sliding bearing 1 is facilitated when, as shown in FIG. 9, it is mounted between an upper spring seat 41 of a coil spring 40 in a strut-type suspension and a mounting member 43 to which a piston rod 42 of a hydraulic damper is secured.

In this case, an upper portion of the piston rod 42 is inserted into the circular hole 101 of the upper casing 100 and the insertion hole 201 of the lower casing 200 in the thrust sliding bearing 1 such as to be rotatable about the axis O in the circumferential direction R with respect to the upper casing 100 and the lower casing 200.

With the strut-type suspension installed by means of the thrust sliding bearing 1, as shown in FIG. 9, at the time of steering operation, the relative rotation of the upper spring seat 41 about the axis O in the circumferential direction R by means of the coil spring 40 is effected smoothly by the relative rotation of the lower casing 200 in the same direction relative to the upper casing 100.

Figure 10:
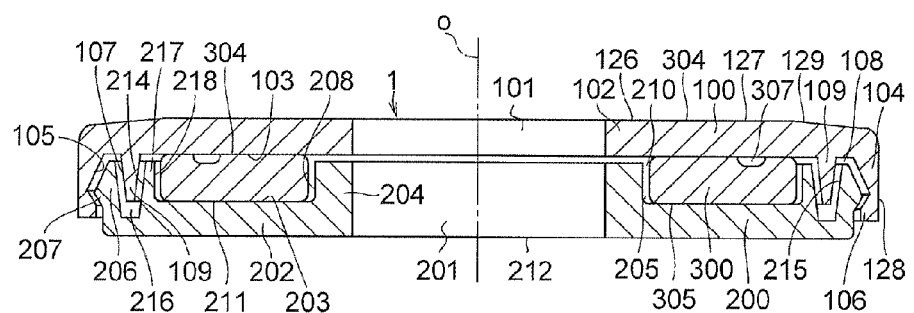
FIG. 10 is an explanatory cross-sectional view of still another preferred embodiment of the invention.

In addition, as shown in FIG. 10, the thrust sliding bearing 1 may be comprised of the upper casing 100 which further includes first cylindrical suspended portion 109 formed integrally on the annular lower surface 103 in such a manner as to be located radially outwardly away from the peripheral edge of the circular hole 101 in the central portion of the upper annular planar portion 102 and to be radially inwardly spaced apart a predetermined interval from the inner peripheral surface 105 of the cylindrical engaging suspended portion 104, so as to form at its outer peripheral surface 107 an upper outer annular groove 108 in cooperation with the inner peripheral surface 105 of the cylindrical engaging suspended portion 104; and the lower casing 200 which further includes third annular protrusion 217 formed integrally on the annular upper surface 203 of the lower annular planar portion 202 in such a manner as to be radially outwardly spaced apart a predetermined interval from the outer peripheral surface 208 of the annular protrusion 204, so as to form at its outer peripheral surface 214 a lower outer annular groove 216 in cooperation with an inner peripheral surface 215 of the annular protrusion 206.

In the above-described upper casing 100 and lower casing 200, the upper casing 100 is combined with the lower casing 200 by causing the annular engaging portion 106 formed on the inner peripheral surface of the end portion of the cylindrical engaging suspended portion 104 to be resiliently fitted to the annular engaging portion 207 formed on the outer peripheral surface of the annular protrusion 206 of the lower casing 200, such that the annular protrusion 206 is disposed in the upper outer annular groove 108, while the cylindrical suspended portion 109 is disposed in the lower outer annular groove 216 so as to radially overlap with the annular protrusion 217 and the annular protrusion 206.

Also with the thrust sliding bearing 1 shown in FIG. 10, the thrust sliding bearing piece 300 having the annular upper surface 304 and lower surface 305 has the inner peripheral surface 301 with a diameter larger than the diameter of the outer peripheral surface 208 of the annular protrusion 204 and the outer peripheral surface 303 with a diameter smaller than the diameter of an inner peripheral surface 218 of the annular protrusion 217, and the thrust sliding bearing piece 300 is interposed between the upper and lower casings 100 and 200 by being disposed in the wide lower annular recess 205 while maintaining an annular clearance between its inner peripheral surface 301 and the outer peripheral surface 208 of the annular protrusion 204 and an annular clearance between its outer peripheral surface 303 and the inner peripheral surface 218 of the annular protrusion 217, such that its upper surface 304 projects above the opening surface 210 of the lower annular recess 205 and is brought into sliding contact with the annular lower surface 103 of the upper annular planar portion 102, while its lower surface 305 is brought into sliding contact with the annular upper surface 203 defining the bottom surface 211 of the wide lower annular recess 205.

According to the thrust sliding bearing 1 shown in FIG. 10, since the upper casing 100 is combined with the lower casing 200 by causing the engaging portions 106 and 207 to be resiliently fitted to each other such that the cylindrical suspended portion 109 is disposed in the lower outer annular groove 216 so as to radially overlap with the annular protrusion 217 and the annular protrusion 206, sealed portions based on labyrinth action are formed at the radially overlapping portions of the cylindrical suspended portion 109 and the annular protrusions 217 and 206 and at the resiliently fitting portions of the engaging portions 106 and 207, thereby preventing the entry of foreign objects such as dust onto the sliding surfaces of the upper and lower casings 100 and 200.

Figure 12:
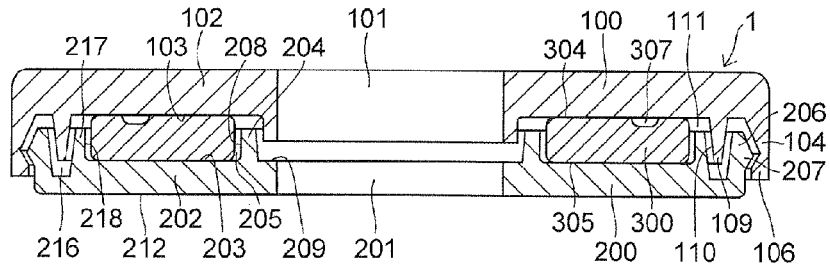
FIG. 12 is an explanatory cross-sectional view of a further preferred embodiment of the invention.

Furthermore, as shown in FIG. 12, the thrust sliding bearing 1 may be comprised of the upper casing 100 which further includes second cylindrical suspended portion 112 formed integrally on the annular lower surface 103 of the upper annular planar portion 102 in such a manner as to be radially inwardly spaced apart a predetermined interval from an inner peripheral surface 110 of the cylindrical suspended portion 109 and having an inner peripheral surface with a diameter identical to that of the circular hole 101 in the central portion of the upper annular planar portion 102, so as to form a wide upper annular recess 111 in cooperation with the inner peripheral surface 110 and the annular lower surface 103 of the upper annular planar portion 102, and the annular protrusion 204 may be radially outwardly adjacent to the insertion hole 201 via an annular shoulder portion 219.

In the thrust sliding bearing 1 shown in FIG. 12, the upper casing 100 is combined with the lower casing 200 by causing the annular engaging portions 106 and 207 to be resiliently fitted to each other, such that a lower end face of the cylindrical suspended portion 112 opposes an upper surface of the annular shoulder portion 219 with a clearance therebetween, and such that the cylindrical suspended portion 112 radially overlaps with the annular protrusion 204.

According to the thrust sliding bearing 1 shown in FIG. 12, since the upper casing 100 is combined with the lower casing 200 by causing the engaging portions 106 and 207 to be resiliently fitted to each other, such that the cylindrical suspended portion 112 radially overlaps with the annular protrusion 204 and such that the cylindrical suspended portion 109 is disposed in the lower outer annular groove 216 so as to radially overlap with the annular protrusion 217 and the annular protrusion 206, sealed portions based on labyrinth action are formed at the radially overlapping portions of the cylindrical suspended portion 112 and the annular protrusion 204, at the radially overlapping portions of the cylindrical suspended portion 109 and the annular protrusions 217 and 206, and at the resiliently fitting portions of the engaging portions 106 and 207, thereby preventing the entry of foreign objects such as dust onto the sliding surfaces of the upper and lower casings 100 and 200.

Figure 13:
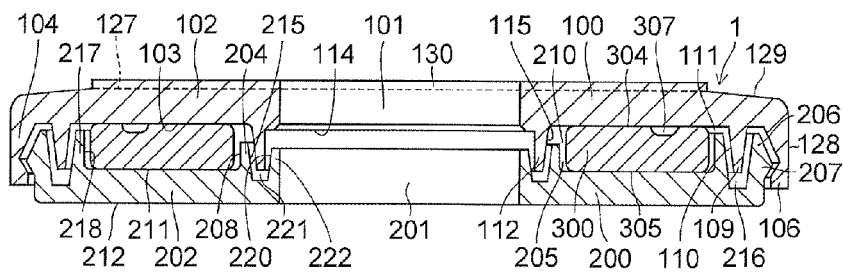
FIG. 13 is an explanatory cross-sectional view of a still further preferred embodiment of the invention.

In addition, as shown in FIG. 13, the thrust sliding bearing 1 may be formed such that the cylindrical suspended portion 112 which forms at its outer peripheral surface 115 the wide upper annular recess 111 in cooperation with the inner peripheral surface 110 of the cylindrical suspended portion 109 and the annular lower surface 103 of the upper annular planar portion 102 is radially outwardly adjacent to the circular hole 101 in the central portion of the upper annular planar portion 102 via an annular shoulder portion 114, and the lower casing 200 further includes fourth annular protrusion 222 which has an inner peripheral surface with a diameter identical to that of the insertion hole 201 formed in the central portion of the lower annular planar portion 202, and which is integrally formed on the annular upper surface 203 of the lower annular planar portion 202 in such a manner as to be radially inwardly spaced apart a predetermined interval from the annular protrusion 204, so as to form at its outer peripheral surface 220 a lower inner annular groove 221 in cooperation with the inner peripheral surface 215 of the annular protrusion 204.

In the thrust sliding bearing 1 shown in FIG. 13, the upper casing 100 is combined with the lower casing 200 by causing the annular engaging portions 106 and 207 to be resiliently fitted to each other, such that the lower surface of the annular shoulder portion 114 opposes the upper end face of the annular protrusion 222 with a clearance therebetween, such that the cylindrical suspended portion 112 is disposed in the lower inner annular groove 221 so as to radially overlap with the annular protrusion 204 and the annular protrusion 222, and such that the cylindrical suspended portion 109 is disposed in the lower outer annular groove 216 so as to radially overlap with both the annular protrusion 217 and the annular protrusion 206.

According to the thrust sliding bearing 1 shown in FIG. 13, since the upper casing 100 is combined with the lower casing 200 by causing the annular engaging portions 106 and 207 to be resiliently fitted to each other, such that the cylindrical suspended portion 112 is disposed in the lower inner annular groove 221 so as to radially overlap with the annular protrusion 204 and the annular protrusion 222 and such that the cylindrical suspended portion 109 is disposed in the lower outer annular groove 216 so as to radially overlap with both the annular protrusion 217 and the annular protrusion 206, sealed portions based on labyrinth action are formed at the radially overlapping portions of the cylindrical suspended portion 112, the annular protrusion 204, and the annular protrusion 222, at the radially overlapping portions of the cylindrical suspended portion 109 and the annular protrusions 217 and 206, and at the resiliently fitting portions of the engaging portions 106 and 207, thereby further preventing the entry of foreign objects such as dust between the upper and lower casings 100 and 200, particularly from the inner peripheral side onto the upper surface 304 serving as the sliding surface.

Figure 14:
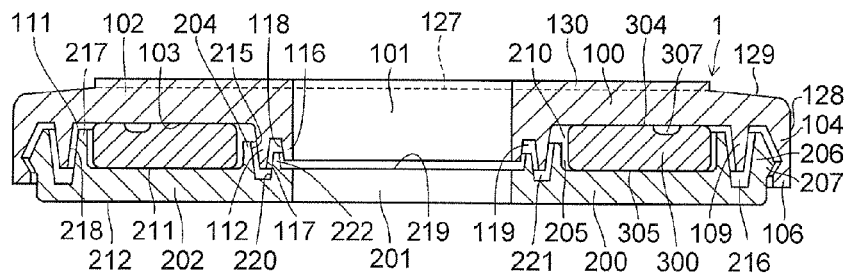
FIG. 14 is an explanatory cross-sectional view of a further preferred embodiment of the invention.

In addition, with the thrust sliding bearing 1, as shown in FIG. 14, the upper casing 100 further includes third cylindrical suspended portion 116 which is integrally formed on a lower surface of the annular shoulder portion 114 of the upper annular planar portion 102 and has an inner peripheral surface with a diameter identical to that of the circular hole 101 in the central portion of the upper annular planar portion 102 so as to form at its outer peripheral surface 118 an upper inner annular groove 119 in cooperation with an inner peripheral surface 117 of the cylindrical suspended portion 112, and the annular protrusion 222 is integrally formed on an upper surface of the annular shoulder portion 219 of the lower annular planar portion 202 in such a manner as to be radially outwardly away from the insertion hole 201 in the central portion of the lower annular planar portion 102.

In the thrust sliding bearing 1 shown in FIG. 14, the upper casing 100 is combined with the lower casing 200 by causing the annular engaging portions 106 and 207 to be resiliently fitted to each other, such that the lower end face of the cylindrical suspended portion 116 opposes the upper surface of the annular shoulder portion 219 of the lower annular planar portion 202 with a clearance therebetween, and the cylindrical suspended portion 116 radially overlaps with the annular protrusion 222, such that the annular protrusion 222 is disposed in the upper inner annular groove 119 so as to radially overlap with both the cylindrical suspended portion 116 and the cylindrical suspended portion 112, such that the cylindrical suspended portion 112 is disposed in the lower inner annular groove 221 so as to radially overlap with the annular protrusion 204 and the annular protrusion 222, and such that the cylindrical suspended portion 109 is disposed in the lower outer annular groove 216 so as to radially overlap with both the annular protrusion 217 and the annular protrusion 206.

According to the thrust sliding bearing 1 shown in FIG. 14, since the upper casing 100 is combined with the lower casing 200 by causing the annular engaging portions 106 and 207 to be resiliently fitted to each other, such that the cylindrical suspended portion 116 radially overlaps with the annular protrusion 222 and the annular protrusion 222 is disposed in the upper inner annular groove 119, such that the cylindrical suspended portion 112 is disposed in the lower inner annular groove 221 so as to radially overlap with the annular protrusion 204 and the annular protrusion 222, and such that the cylindrical suspended portion 109 is disposed in the lower outer annular groove 216 so as to radially overlap with both the annular protrusion 217 and the annular protrusion 206, sealed portions based on labyrinth action are respectively formed at the radially overlapping portions of the cylindrical suspended portion 116 and the annular protrusion 222, at the radially overlapping portions of the cylindrical suspended portion 112, the annular protrusion 222, and the annular protrusion 204, at the radially overlapping portions of the cylindrical suspended portion 109 and the annular protrusions 217 and 206, and at the resiliently fitting portions of the engaging portions 106 and 207, thereby further preventing the entry of foreign objects such as dust onto the sliding surfaces between the upper and lower casings 100 and 200.

Figure 16:
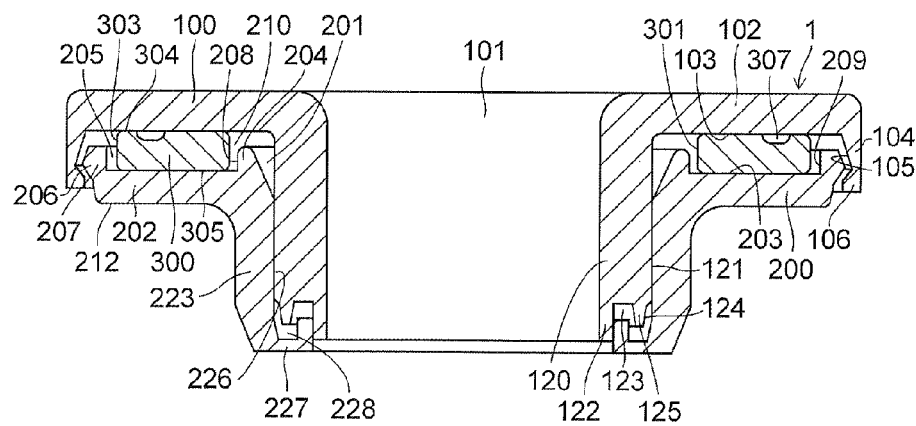
FIG. 16 is an explanatory cross-sectional view of a further preferred embodiment of the invention.

Furthermore, as shown in FIG. 16, the thrust sliding bearing 1 may be comprised of the upper casing 100 including the upper annular planar portion 102 having the circular hole 101 in its central portion, a hollow cylindrical portion 120 formed integrally on the annular lower surface 103 of the upper annular planar portion 102 and having an inner peripheral surface with a diameter identical to that of the circular hole 101, the cylindrical engaging suspended portion 104 formed integrally on the outer peripheral edge of the annular lower surface 103 in such a manner as to be radially outwardly spaced apart a predetermined distance from an outer peripheral surface 121 of the hollow cylindrical portion 120; the annular engaging portion 106 formed integrally on the end portion of the inner peripheral surface 105 of the cylindrical engaging suspended portion 104, an annular protrusion 122 protruding integrally downwardly from a lower end portion of the hollow cylindrical portion 120, and an annular protrusion 125 which protrudes integrally downwardly from a lower end portion of the hollow cylindrical portion 120 so as to form an annular recess 123 in cooperation with the annular protrusion 122, and which has a tapered surface 124 at its outer surface and is tapered in a direction toward the lower side; and the lower casing 200 including the lower annular planar portion 202 having the insertion hole 201 in its central portion, a hollow cylindrical portion 223 which is integrally formed on the annular lower surface 212 of the lower annular planar portion 202 and has an inner peripheral surface 226 with a diameter identical to that of the insertion hole 201, the annular protrusion 204 formed integrally on the annular upper surface 203 of the lower annular planar portion 202, the annular protrusion 206 formed integrally on the outer peripheral edge of the annular upper surface 203 in such a manner as to be radially outwardly spaced apart a predetermined interval from the outer peripheral surface 208 of the annular protrusion 204, the annular engaging portion 207 formed at the lower end of the outer peripheral surface of the annular protrusion 206, an annular protrusion 227 extending radially inwardly from a lower end of the inner peripheral surface 226 of the hollow cylindrical portion 223, and an annular recess 228 formed in the annular protrusion 227, wherein the upper casing 100 is combined with the lower casing such that the outer peripheral surface 121 of the hollow cylindrical portion 120 is brought into sliding contact with the inner peripheral surface 226 of the hollow cylindrical portion 223, the engaging portion 106 is resiliently fitted to the engaging portion 207, and the annular protrusion 125 is disposed in the annular recess 228.

Also with the thrust sliding bearing 1 shown in FIG. 16, the thrust sliding bearing piece 300 is similar to the thrust sliding bearing piece 300 shown in FIG. 1, and the thrust sliding bearing piece 300 has the circular hole 302 defined by the inner peripheral surface 301 with a diameter larger than the diameter of the outer peripheral surface 208 of the annular protrusion 204, the outer peripheral surface 303 with a diameter smaller than the diameter of the annular protrusion 206, and the annular upper surface 304 and lower surface 305. This thrust sliding bearing piece 300 is interposed between the upper and lower casings 100 and 200 by being disposed in the wide lower annular recess 205 while maintaining annular clearances respectively between its inner peripheral surface 301 and the outer peripheral surface 208 of the annular protrusion 204 and between its outer peripheral surface 303 and the inner peripheral surface 209 of the annular protrusion 206, such that its upper surface 304 is situated above the opening surface 210 of the lower annular recess 205 and is brought into sliding contact with the annular lower surface 103 of the upper annular planar portion 102, while its lower surface 305 is brought into sliding contact with the annular upper surface 203 defining the bottom surface 211 of the lower annular recess 205.

According to the thrust sliding bearing 1 shown in FIG. 16, in the same way as the above-described embodiments, the steering operation can be effected smoothly by allowing smooth relative rotation in the circumferential direction R between the upper casing 100 and the lower casing 200 under a thrust load, and the relative rotation in the circumferential direction R between the upper casing 100 and the lower casing 200 under a thrust load can be smoothly allowed by the sliding of the synthetic resins in the radial bearing portion formed by the outer peripheral surface 121 of the hollow cylindrical portion 120 of the upper casing 100 and the inner peripheral surface 226 of the hollow cylindrical portion 223 of the lower casing 200.

Figure 11:
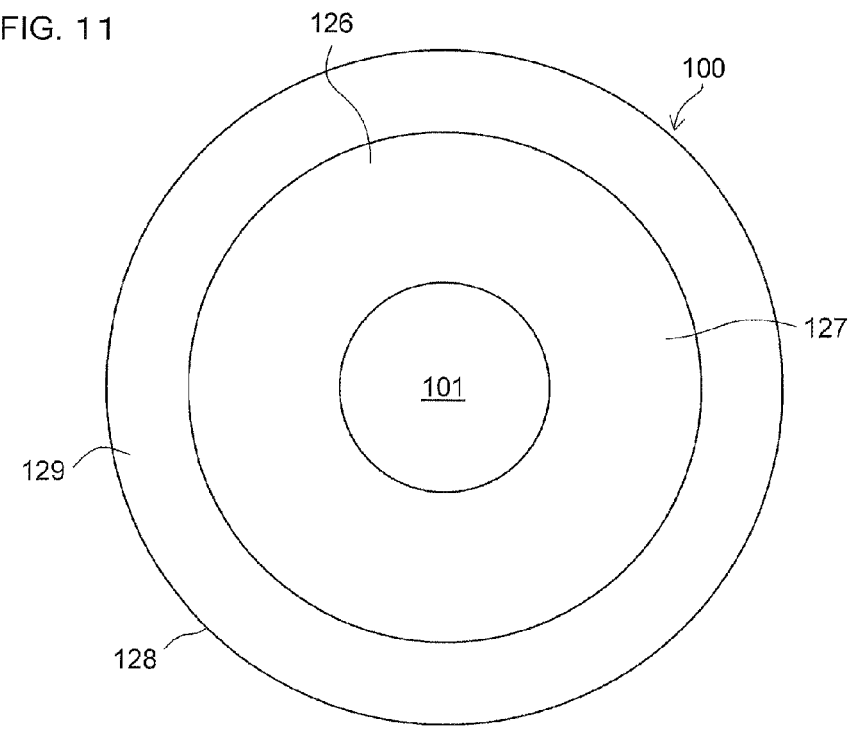
FIG. 11 is an explanatory plan view of the embodiment shown in FIG. 10.

In each of the above-described thrust sliding bearings 1, the upper annular planar portion 102 of the upper casing 100 may include an annular upper surface 126 having an annular circular belt-shaped flat surface 127 with a predetermined width in the radially outward direction from the outer peripheral edge of the circular hole 101 and a truncated conical surface 129 sloping downwardly from an outer peripheral edge of the circular belt-shaped flat surface 127 to a cylindrical outer peripheral surface 128 of the cylindrical engaging suspended portion 104, as shown in FIGS. 10 and 11. Furthermore, the upper annular planar portion 102 of the upper casing 100 may have a circular belt-shaped projecting portion 130 formed integrally on the circular belt-shaped flat surface 127 in such a manner as to project axially upwardly from the circular belt-shaped flat surface 127, as well as the truncated conical surface 129 sloping downwardly from the outer peripheral edge of the circular belt-shaped flat surface 127 to the outer peripheral surface 128, as shown in FIGS. 13 and 14.

Figure 15:
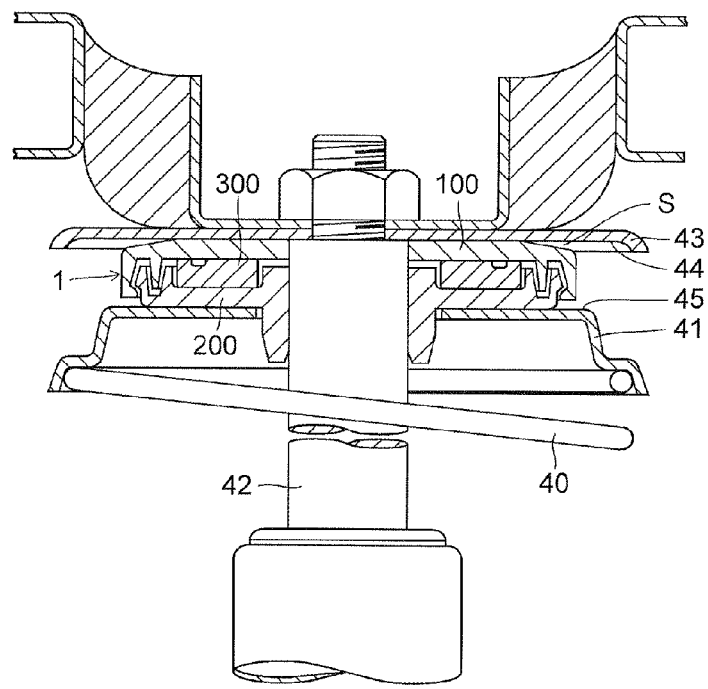
FIG. 15 is an explanatory cross-sectional view of an example in which the thrust sliding bearing of the embodiment shown in FIG. 10 is incorporated in a strut-type suspension.

As shown in FIG. 15, the thrust sliding bearing 1, which includes the upper casing 100 having the annular upper surface 126 constituted by the annular circular belt-shaped flat surface 127 and the truncated conical surface 129 and is incorporated in the strut-type suspension, is disposed between a lower surface 44 of the vehicle body-side mounting member 43 and an upper surface 45 of the upper spring seat 41 opposing that lower surface 44, such that only the annular circular belt-shaped flat surface 127 is brought into contact with the lower surface 44 of the vehicle body-side mounting member 43, while, at its other portions, maintaining a space S with respect to the lower surface 44 of the vehicle body-side mounting member 43. Therefore, even in the case where a fluctuating load such as an inclination has acted on the vehicle body-side mounting member 43, interference does not occur at the radially overlapping portions of the cylindrical suspended portion 109 and the annular protrusions 217 and 206, as well as at the resiliently fitting portions of the engaging portion 106 and the engaging portion 207. Hence, it is possible to avoid defects such as deformation, damage, breakage, and the like in these overlapping portions and resiliently fitting portions.

Figure 17:
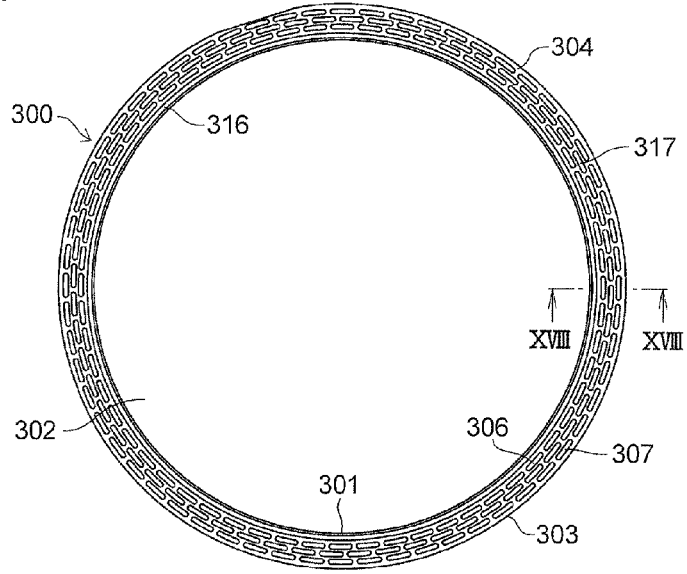
FIG. 17 is a plan view of another preferred example of the thrust sliding bearing piece in the embodiment shown in FIG. 1.
Figure 18:
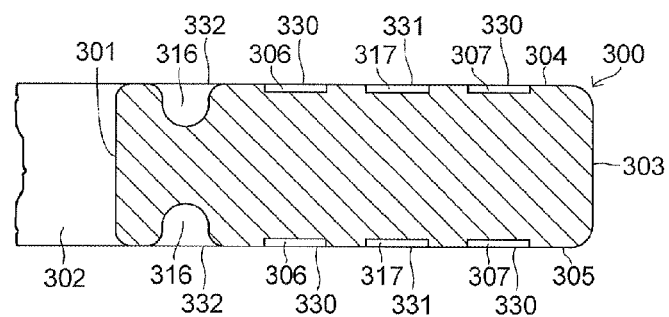
FIG. 18 is an explanatory cross-sectional view, taken in the direction of arrows along line XVIII-XVIII, of the thrust sliding bearing piece in the embodiment shown in FIG. 17.
Figure 19:
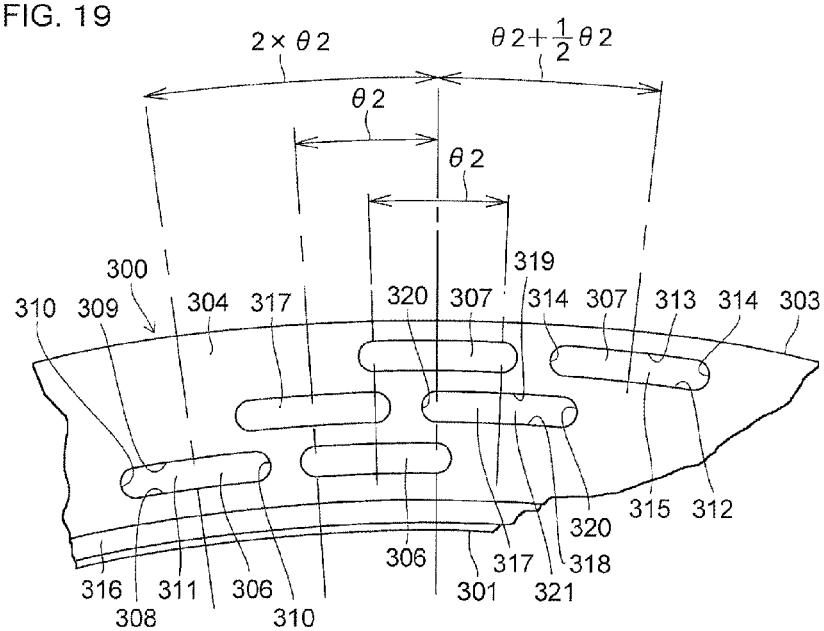
FIG. 19 is a partially enlarged explanatory plan view of the thrust sliding bearing shown in FIG. 17.
Figure 20:
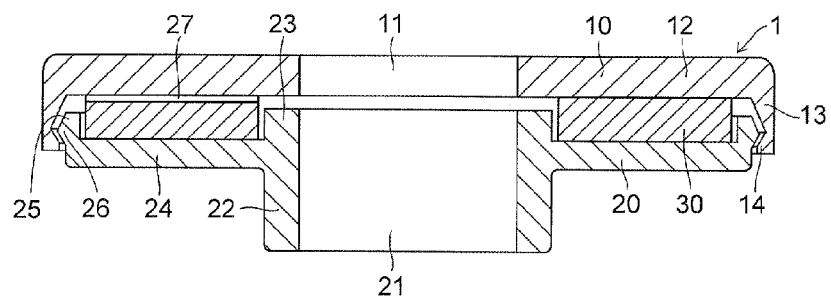
FIG. 20 is an explanatory cross-sectional view of a conventional synthetic resin-made thrust sliding bearing.
Figure 21:
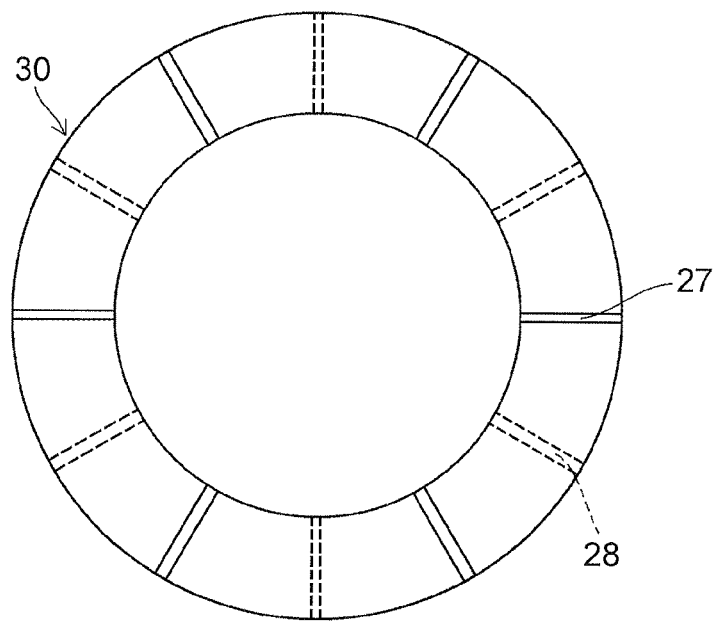
FIG. 21 is an explanatory plan view of a thrust sliding bearing piece used in the thrust sliding bearing shown in FIG. 20.

As shown in FIGS. 17 to 19, on at least one of the upper surface 304 and the lower surface 305, i.e., in this embodiment on both the upper surface 304 and the lower surface 305 serving as the thrust sliding bearing surfaces, the thrust sliding bearing piece 300 interposed between the upper casing 100 and the lower casing 200 has an annular recessed portion 316 formed in such a manner as to surround the circular hole 302, pluralities of inner recessed portions 306, intermediate recessed portions 317, and outer recessed portions 307 which are formed on its upper surface 304 and lower surface 305 along the circumferential direction R in three rows including an inner row, an intermediate row, and an outer row in the radial direction X, and a lubricating oil filled in each of the recessed portion 316, the inner recessed portions 306, the intermediate recessed portions 317, and the outer recessed portions 307. The inner recessed portions 306, the intermediate recessed portions 317, and the outer recessed portions 307 are formed with a phase difference of a predetermined angle θ2, i.e., an angle θ2=4° in this embodiment, in the circumferential direction with respect to each other.

The plurality of intermediate recessed portions 317 in the intermediate row, which are arranged along the circumferential direction R in such a manner as to be radially outwardly spaced apart a predetermined interval from the plurality of inner recessed portions 306 located in the inner row and to be radially inwardly spaced apart a predetermined interval from the plurality of outer recessed portions 307 located in the outer row, are each defined by an inner arcuate wall surface 318 extending arcuately in the circumferential direction R about the axis O; an outer arcuate wall surface 319 extending arcuately in the circumferential direction R about the axis O on the radially outer side with respect to the inner arcuate wall surface 318; a pair of semicircular wall surfaces 320 respectively connected to both the inner arcuate wall surface 318 and the outer arcuate wall surface 319 and opposing each other in the circumferential direction R; and a bottom surface 321 connected to the inner arcuate wall surface 318, the outer arcuate wall surface 319, and the pair of semicircular wall surfaces 320.

The pluralities of inner recessed portions 306, intermediate recessed portions 317, and outer recessed portions 307, and the recessed portion 316, which are formed on the annular upper surface 304 of the thrust sliding bearing piece 300 along the circumferential direction R in three rows including the inner row, the intermediate row, and the outer row in the radial direction X, are formed such that the ratio of a total area of opening surfaces 330 of the inner recessed portions 306 and the outer recessed portions 307, opening surfaces 331 of the intermediate recessed portions 317, and opening surfaces 332 of the recessed portion 316 to a total area of the upper surface 304 is set to 20 to 50%, preferably 30 to 40%, i.e., to 40% in the embodiment shown in FIG. 17. The pluralities of inner recessed portions 306, intermediate recessed portions 317, and outer recessed portions 307, and the recessed portion 316 are also similarly formed on the annular lower surface 305 of the thrust sliding bearing piece 300.

In the thrust sliding bearing 1 having the thrust sliding bearing piece 300 shown in FIGS. 17 to 19, as the inner recessed portions 306, the intermediate recessed portions 317, the outer recessed portions 307, and the annular recessed portion 316 are formed on the annular upper surface 304 and lower surface 305 of the thrust sliding bearing piece 300, the area of contact between, on the one hand, e.g., the annular upper surface 304 serving as the sliding surface and, on the other hand, the mating member, i.e., the annular lower surface 103 of the upper annular planar portion 102 of the upper casing 100, is reduced to thereby increase the surface pressure (load per unit area) acting on the annular upper surface 304, whereby it is possible to attain further reduction of friction through the combination of the reduction of friction by virtue of the friction among synthetic resins and of the reduction of friction by virtue of the presence at the sliding surfaces of the lubricating oil filled in the inner recessed portions 306, the intermediate recessed portions 317, the outer recessed portions 307, and the recessed portion 316.

Also with the thrust sliding bearings 1 in the embodiments shown in FIG. 10 and FIGS. 12 to 14, the hollow cylindrical portion 213 may be integrally formed on the annular lower surface 212 of the lower annular planar portion 202 of the lower casing 200 in the same way as the thrust sliding bearing 1 in the embodiment shown in FIG. 8.

As described above, with the thrust sliding bearing 1 in accordance with the present invention, since the pluralities of inner recessed portions 306 and outer recessed portions 307 are formed on at least one surface of the annular upper surface 304 and the lower surface 305 of the thrust sliding bearing piece 300, which is interposed between the upper and lower casings 100 and 200, by being arranged along the circumferential direction R, i.e., the sliding direction, with a circumferential phase difference at least in two rows including the inner row and the outer row spaced apart in the radial direction X, the lubricating oil such as grease filled in the inner recessed portions 306 and the outer recessed portions 307 is constantly fed to the sliding surfaces during the relative sliding in the circumferential direction R of the upper casing 100, the lower casing 200, and the thrust sliding bearing piece 300. In consequence, it is possible to obtain a thrust sliding bearing which is capable of exhibiting further lower frictional properties through the combination of low frictional properties by virtue of the constant presence of the lubricating oil at the sliding surfaces during sliding and of the reduction of friction in the sliding among synthetic resins by virtue of the reduction of the contact area, with respect to the mating member, of at least one of the upper surface 304 and the lower surface 305 serving as the sliding surfaces of the thrust sliding bearing piece 300.

DESCRIPTION OF REFERENCE NUMERALS

1: thrust sliding bearing
100: upper casing
200: lower casing
300: thrust sliding bearing piece
101: circular hole
102: annular planar portion
103: annular lower surface
104: cylindrical engaging suspended portion
106: engaging portion
201: insertion hole 202: annular planar portion
203: annular upper surface
204, 206: annular protrusion
205: annular recess
207: engaging portion
302: circular hole
304: upper surface
305: lower surface
306: inner recessed portion
307: outer recessed portion
308: inner arcuate wall surface
309: outer arcuate wall surface
310: semicircular wall surface

The invention claimed is:

1. A thrust sliding bearing comprising: an upper casing having an upper annular planar portion; a synthetic resin-made lower casing which is superposed on said upper casing so as to be rotatable about an axis of said upper casing and has a lower annular planar portion opposing the upper annular planar portion of said upper casing, a first and a second annular protrusion formed on the lower annular planar portion concentrically with each other, and a lower annular recess surrounded by the first and the second annular protrusion; and a synthetic resin-made thrust sliding bearing piece disposed in the lower annular recess of the lower casing and having an annular thrust sliding bearing surface which is brought into sliding contact with at least one of the upper annular planar portion and the lower annular planar portion,
wherein said thrust sliding bearing piece has first inner recessed portions which are arranged on the thrust sliding bearing surface along a circumferential direction, second outer recessed portions which are arranged on the thrust sliding bearing surface along a circumferential direction outside first inner recessed portions in a radial direction, and a lubricating oil filled in each of said first of inner recessed portions and said second outer recessed portions, the first inner recessed portions and the second outer recessed portions being arranged with a circumferential phase difference with respect to each other,
wherein each of said first inner recessed portions is defined by an inner arcuate wall surface extending arcuately about the axis, an outer arcuate wall surface extending arcuately about the axis on a radially outer side with respect to the inner arcuate wall surface, a pair of partially circular wall surfaces respectively connected to both the inner arcuate wall surface and the outer arcuate wall surface and opposing each other in the circumferential direction, and a bottom surface connected to the inner arcuate wall surface, the outer arcuate wall surface, and the pair of partially circular wall surfaces,
wherein each of said second outer recessed portions is defined by an inner arcuate wall surface extending arcuately about the axis, an outer arcuate wall surface extending arcuately about the axis on the radially outer side with respect to the inner arcuate wall surface, a pair of partially circular wall surfaces respectively connected to both the inner arcuate wall surface and the outer arcuate wall surface and opposing each other in the circumferential direction, and a bottom surface connected to the inner arcuate wall surface, the outer arcuate wall surface, and the pair of partially circular wall surfaces,
wherein each of said first inner recesses portions and each of said second outer recesses portions corresponding to said each of first inner recesses portions are arranged partially overlapping in the radial direction, respectively.

2. The thrust sliding bearing according to claim 1, wherein a ratio of a total area of opening surfaces of the first inner recessed portions and second outer recessed portions to a total area of surfaces combining the opening surfaces of the first inner recessed portions and second outer recessed portions and the thrust sliding bearing surface is 20 to 50%.

3. The thrust sliding bearing according to claim 1, wherein said thrust sliding bearing piece has a circular hole and an annular recessed portion formed on the thrust sliding bearing surface in such a manner as to surround the circular hole.

4. The thrust sliding bearing according to claim 3, wherein a ratio of a total area of a opening surfaces of the first inner recessed portions and second outer recessed portions to a total area of surfaces combining an opening surface of the annular recessed portion, the opening surfaces of the first inner recessed portions and second outer recessed portions, and the thrust sliding bearing surface is 20 to 50%.

5. The thrust sliding bearing according to claim 1, wherein the upper annular planar portion has a circular hole in its central portion, the lower annular planar portion having in its central portion an insertion hole concentric with the circular hole of the upper annular planar portion; said upper casing has a cylindrical engaging suspended portion formed integrally on an outer peripheral edge of an annular lower surface of the upper annular planar portion and an annular engaging portion formed on an inner peripheral surface of the cylindrical engaging suspended portion; the first annular protrusion is integrally formed on an annular upper surface of the lower annular planar portion, while the second annular protrusion is integrally formed on an outer peripheral edge of the annular upper surface of the lower annular planar portion in such a manner as to be radially outwardly spaced apart a predetermined interval from the first annular protrusion; the lower annular recess is defined by an outer peripheral surface of the first annular protrusion, an inner peripheral surface of the second annular protrusion, and the annular upper surface of the lower annular planar portion; and said lower casing further has an annular engaging portion formed on an outer peripheral surface of the second annular protrusion, and said upper casing is combined with said lower casing by causing the annular engaging portion thereof to be resiliently fitted to the annular engaging portion of said lower casing.

6. The thrust sliding bearing according to claim 5, wherein said upper casing further includes a first cylindrical suspended portion formed integrally on the annular lower surface of the upper annular planar portion in such a manner as to be located radially outwardly away from a peripheral edge of the circular hole in the central portion of the upper annular planar portion and to be radially inwardly spaced apart a predetermined interval from the inner peripheral surface of the cylindrical engaging suspended portion, so as to form at its outer peripheral surface an upper outer annular groove in cooperation with the inner peripheral surface of the cylindrical engaging suspended portion; said lower casing further includes a third annular protrusion formed integrally on the annular upper surface of the lower annular planar portion in such a manner as to be radially outwardly spaced apart a predetermined interval from the outer peripheral surface of the first annular protrusion, so as to form at its outer peripheral surface a lower outer annular groove in cooperation with an inner peripheral surface of the second annular protrusion; and said upper casing is combined with said lower casing such that the second annular protrusion is disposed in the upper outer annular groove, while the first cylindrical suspended portion is disposed in the lower outer annular groove so as to radially overlap with the second annular protrusion and the third annular protrusion.

7. The thrust sliding bearing according to claim 6, wherein said upper casing further includes a second cylindrical suspended portion formed integrally on the annular lower surface of the upper annular planar portion in such a manner as to be radially inwardly spaced apart a predetermined interval from an inner peripheral surface of the first cylindrical suspended portion, so as to form a upper annular recess in cooperation with the inner peripheral surface and the annular lower surface of the upper annular planar portion, and the first annular protrusion being radially outwardly adjacent to the insertion hole via an annular shoulder portion, and wherein said upper casing is combined with said lower casing such that a lower end face of the second cylindrical suspended portion opposes an upper surface of the annular shoulder portion with a clearance therebetween, and such that the second cylindrical suspended portion radially overlaps with the first annular protrusion.

8. The thrust sliding bearing according to claim 7, wherein the second cylindrical suspended portion has an inner peripheral surface with a diameter identical to that of the circular hole in the central portion of the upper annular planar portion.

9. The thrust sliding bearing according claim 7, wherein the second cylindrical suspended portion is radially outwardly adjacent to the insertion hole in the central portion of the upper annular planar portion via an annular shoulder portion, and said lower casing further includes a fourth annular protrusion which is integrally formed on an upper surface of the annular shoulder portion of the lower annular planar portion in such a manner as to be radially inwardly spaced apart a predetermined interval from the first annular protrusion, so as to form at its outer peripheral surface a lower inner annular groove in cooperation with the inner peripheral surface of the first annular protrusion, and wherein said upper casing is combined with said lower casing such that the second cylindrical suspended portion is disposed in the lower inner annular groove so as to radially overlap with the first annular protrusion and the fourth annular protrusion.

10. The thrust sliding bearing according to claim 9, wherein the fourth annular protrusion has an inner peripheral surface with a diameter identical to that of the insertion hole formed in the central portion of the lower annular planar portion.

11. The thrust sliding bearing according to claim 9, wherein said upper casing further includes a third cylindrical suspended portion which is integrally formed on a lower surface of the annular shoulder portion of the upper annular planar portion and has an inner peripheral surface with a diameter identical to that of the circular hole in the central portion of the upper annular planar portion so as to form at its outer peripheral surface an upper inner annular groove in cooperation with an inner peripheral surface of the second cylindrical suspended portion, and the fourth annular protrusion is integrally formed on an upper surface of the annular shoulder portion of the lower annular planar portion in such a manner as to be radially outwardly away from the insertion hole in the central portion of the lower annular planar portion, and wherein said upper casing is combined with said lower casing such that a lower end face of the third cylindrical suspended portion opposes the upper surface of the annular shoulder portion of the lower annular planar portion with a clearance therebetween, and the third cylindrical suspended portion radially overlaps with the fourth annular protrusion, and such that the fourth annular protrusion is disposed in the upper inner annular groove.

12. The thrust sliding bearing according to claim 5, wherein said lower casing further includes a hollow cylindrical portion which is integrally formed on the annular lower surface of the lower annular planar portion and has an inner peripheral surface with a diameter identical to the insertion hole in the central portion of the annular lower surface.

13. The thrust sliding bearing according to claim 5, wherein said upper casing further includes a hollow cylindrical portion which is integrally formed on the annular lower surface of the upper annular planar portion and has an inner peripheral surface with a diameter identical to the circular hole in the central portion of the upper annular planar portion, and said lower casing further includes a hollow cylindrical portion which is integrally formed on the annular lower surface of the lower annular planar portion and has an inner peripheral surface with a diameter identical to the insertion hole, and wherein said upper casing is combined with said lower casing such that an outer peripheral surface of the hollow cylindrical portion is brought into sliding contact with the inner peripheral surface of the hollow cylindrical portion of said lower casing.

14. The thrust sliding bearing according to claim 5, wherein the upper annular planar portion has an annular upper surface having a circular belt-shaped flat surface with a predetermined width in a radially outward direction from the outer peripheral edge of the circular hole in the central portion and a truncated conical surface sloping downwardly from an outer peripheral edge of the circular belt-shaped flat surface to a cylindrical outer peripheral surface of the cylindrical engaging suspended portion.

15. The thrust sliding bearing according to claim 5, wherein the upper annular planar portion further has a circular belt-shaped projecting portion which integrally projects axially upwardly from the circular belt-shaped flat surface with the predetermined width in the radially outward direction from the outer peripheral edge of the circular hole in the central portion.

* * * * *